United States Patent
Schaemann et al.

(10) Patent No.: US 9,502,981 B2
(45) Date of Patent: Nov. 22, 2016

(54) ENHANCED POWER FACTOR CORRECTION

(71) Applicant: Infineon Technologies Austria AG, Villach (AT)

(72) Inventors: Marcus Schaemann, Munich (DE); Torsten Hinz, Augsburg (DE)

(73) Assignee: Infineon Technologies Austria AG, Villach (AT)

( * ) Notice: Subject to any disclaimer, the term of this patent is extended or adjusted under 35 U.S.C. 154(b) by 138 days.

(21) Appl. No.: 14/260,933

(22) Filed: Apr. 24, 2014

(65) Prior Publication Data
US 2015/0311803 A1   Oct. 29, 2015

(51) Int. Cl.
H05B 37/00 (2006.01)
H02M 3/335 (2006.01)
H02M 1/12 (2006.01)
H02M 1/42 (2007.01)
H05B 33/08 (2006.01)

(52) U.S. Cl.
CPC ............ H02M 3/33507 (2013.01); H02M 1/12 (2013.01); H02M 1/4208 (2013.01); H02M 1/4258 (2013.01); H05B 33/0815 (2013.01); Y02B 20/346 (2013.01); Y02B 70/126 (2013.01)

(58) Field of Classification Search
CPC ....... H05B 41/16; H05B 33/02; H05B 33/08

USPC ........ 315/291, 307, 312, 200 R, 209 R, 246, 315/274, 276, 279
See application file for complete search history.

(56) References Cited

U.S. PATENT DOCUMENTS

| | | | | |
|---|---|---|---|---|
| 2010/0026208 A1* | 2/2010 | Shteynberg | ........ | H05B 33/0815 315/297 |
| 2011/0080111 A1* | 4/2011 | Nuhfer | ............... | H05B 33/0815 315/291 |
| 2011/0210707 A1* | 9/2011 | Marsili | .................. | H02M 3/158 323/271 |
| 2012/0153834 A1* | 6/2012 | Moss | .................. | H05B 33/0815 315/122 |
| 2012/0319588 A1* | 12/2012 | Sid | ...................... | H05B 41/2855 315/129 |
| 2014/0003094 A1* | 1/2014 | Sorensen | ............... | H02M 3/337 363/21.02 |
| 2014/0252974 A1* | 9/2014 | Kim | ........................ | H05B 37/02 315/206 |

* cited by examiner

*Primary Examiner* — Minh D A
(74) *Attorney, Agent, or Firm* — Shumaker & Sieffert, P.A.

(57) ABSTRACT

A power converter is described that includes a switch. The power converter may also include a controller that controls the switch. The controller may be configured to ascertain a first parameter. Additionally, the controller may be configured to ascertain a second parameter. The controller may dynamically modulate duty cycle of the switch based on the first parameter and the second parameter in addition and independent of the control loop.

20 Claims, 10 Drawing Sheets

ENHANCED POWER FACTOR CORRECTION

TECHNICAL FIELD

This disclosure relates to power converters, and more particular, to techniques and circuits associated with switched-mode power converters.

BACKGROUND

Some circuits may use power converters that receive a power input from a power source and convert the power input to a power output that has a different (e.g., regulated) voltage or current level than the voltage or current level of the power input. The converter outputs the power for powering a component, a circuit, or other electrical device. Switch-based power converters may use half-bridge circuits and signal modulation techniques to regulate the current or voltage level of a power output. In some examples, power converters may use additional feedback control circuits and techniques (e.g., voltage sensing, current sensing, and the like) to improve the accuracy and control of the voltage or current level of the power output. These aforementioned techniques and circuits for improving the accuracy and control of the voltage or current of the power output may decrease overall efficiency of the power converter and/or increase the physical size, complexity, and/or cost of the power converter.

SUMMARY

In general, techniques and circuits are described that may optimize power factor and total harmonic distortion (THD) of a power converter. In some examples, the power converter may be a single-stage power converter. It will be understood, however, that the techniques described herein may also be applied to power converters with two or more stages, e.g., dual stage power converters. In an example, the proposed method may allow combining a power factor correction (PFC) stage and power conversion stage into a single stage power converter while maintaining an excellent power factor to minimize size and cost by performing both PFC and power conversion using one stage. The techniques described herein may exploit digital control of the power converter. The operation of the power converter may be adjusted based on a wide range of parameters, for example, input voltage, output voltage, output current, output power, input filter impedance, phase-angle of the AC input and other parameters.

In some examples, the operation of the power converter may be tuned according to knowledge about the behavior of the input filter, e.g., the capacitance of a capacitor that is used in the input filter, the impedance of the input filter, etc., which may result in an optimized power factor of the combination of the known input filter impedance and the power converter impedance, regardless of variations on the line side, i.e., the input voltage side, or load side, i.e., the output voltage side of the power converter.

In one example, the disclosure is directed to a power converter including a switch and a controller configured to measure a first parameter, ascertain a second parameter, and dynamically modulate the duty cycle of the switch based on the first parameter and the second parameter. The modulation of duty cycle can be in addition and independent of the control loop. The frequency of the modulation can be derived from the input frequency and can be independent from switching frequency and control loop frequency.

In another example, the disclosure is directed to a method that includes measuring a first parameter, ascertaining a second parameter, and dynamically modulating a duty cycle of a switch controlling a power converter based on the first parameter and the second parameter.

In another example, the disclosure is directed to a power converter having switching means, means for measure a first parameter, means for ascertain a second parameter, and means for dynamically modulating a duty cycle of the switch based on the first parameter and the second parameter. Examples for modulation of duty cycle are modulation on time or modulation of switching period or switching frequency.

The details of one or more examples are set forth in the accompanying drawings and the description below. Other features, objects, and advantages of the disclosure will be apparent from the description and drawings, and from the claims.

DETAILED DESCRIPTION

Figure 1:
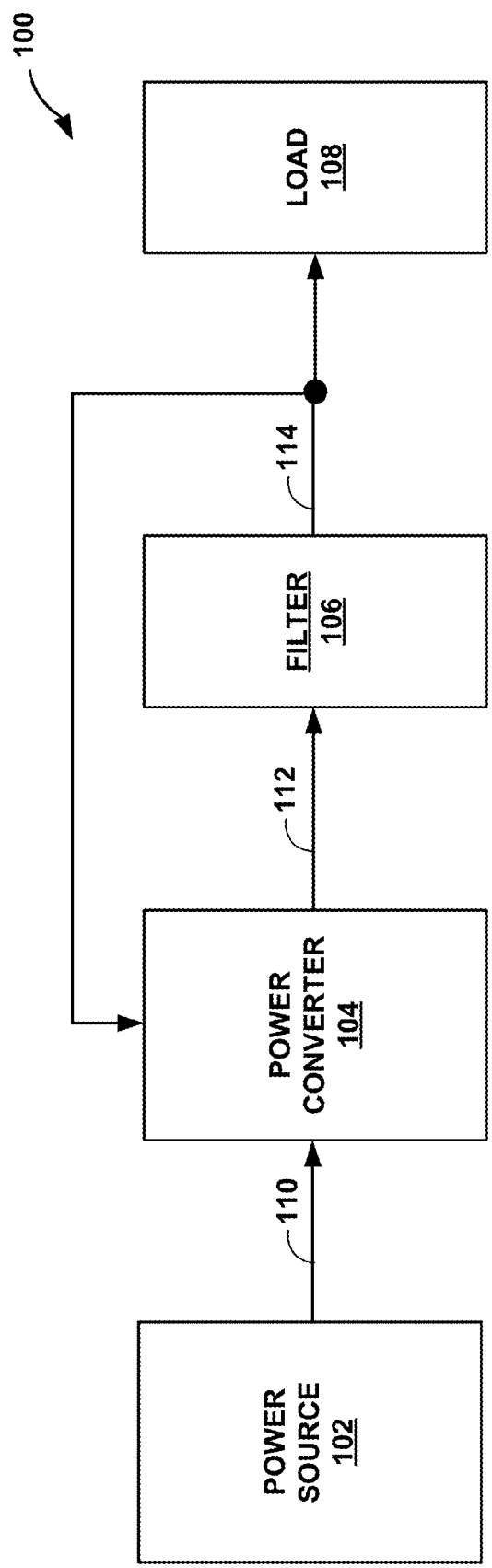
FIG. 1 is a block diagram illustrating an example system for converting power from a power source, in accordance with one or more aspects of the present disclosure.

In some applications, a switch-based power converter (hereafter referred to as a "power converter" or simply a "converter") may receive a power input and convert the power input to a power output that has a voltage or current level that is different (e.g., regulated) than the voltage or current level of the power input, for instance, to provide the power output to a filter for powering a load (e.g., a device).

As described herein, the term "step-up" refers to a power converter configured to receive an input power signal with a first voltage level (or first current level), and output a power signal with a second voltage level (or current level) that is greater than the first voltage level (or current level). As also described herein, the term "step-down" converter refers to a power converter configured to receive an input power signal with a first voltage level (or current level), and output a power signal with a second voltage level (or current level) that is less than the first voltage level (or current level).

The quality of electrical power drawn from a power source, e.g., an electrical power distribution network, may have restrictions. These restrictions may relate to how a device draws power from the power source may distort the electrical signal. Generally, this distortion may be required to be low. Accordingly, a device drawing power may need a very high power factor, i.e., the load should be resistive rather than capacitive or inductive.

The power factor of an alternating current electrical power system is the ratio of the real power flowing to the load, to the apparent power in the circuit. The power factor is a dimensionless number between −1 and 1. Real power is the capacity of a circuit for performing work at particular time. Apparent power is the product of the current and the voltage of the circuit. Capacitive loads and inductive loads may store energy and return it to the source, which may distort the shape of the wave form of the power source.

Capacitive or inductive loads may stress the power source, such as an electrical power distribution network, by returning energy to the power source, while resistive loads do not stress the power distribution network in this way. Rather, resistive loads just draw current, without pushing current back out onto the network. As described above, capacitive or inductive loads may pull power from the network, store the power, not actually use some of the power, and then push the power back onto the power network. This may negatively affect the power network more than current draw of a resistive load.

Some systems may adapt a device to a power network in terms of acceptable power factor and total harmonic distortion (THD) by using a two-stage or dual stage system having a power factor correction stage as an input stage and a power converter stage as a second stage. One example method optimizes power factor and THD of a single-stage power converter. Some example ways of optimizes power factor and THD include (1) usage of a dual-stage power converter, (2) the use of a constant on-time for a single-stage power converter, and (3) using an instantaneous input voltage to shape the on-time of a flyback converter.

Usage of a dual-stage power converter may include a power factor correction (PFC) stage and a main power conversion stage. This has a disadvantage in that it requires, "high effort." In other words, it requires two stages rather than a single stage. Accordingly, this option may use higher component counts than other options. These extra components may increase parts costs, increase space required for the circuitry on a printed circuit board or die, increase the complexity of a bill-of-materials for the power supply or device including such a power supply. Additionally, these extra components may draw additional current, increasing the power consumption of the circuit, in some cases.

For a typical single-stage power converter, however, a typical solution for power factor correction (PFC) is the use of a constant on-time. This will generally optimize power factor only for high output power and low input voltage. Additionally, if the input filter has significant non-resistive impedance, the power factor of the combination of power converter and input filter may be insufficient.

In some examples, power factor may be improved by shaping the on-time of the flyback converter based on the instantaneous input voltage. The on-time may be increased for low input voltages to improve the shape of the input current as the on-time is related with the conductance of the flyback converter. This typically improves the input current shape at the end of a half wave of an input signal. It may, however, worsen the shape of the input current at the beginning of a half wave in topologies with non-resistive impedance input filters, however. In other words, the input current may not follow the input voltage at the beginning of a half wave of an input signal.

The best power factors are when AC current and AC voltage are exactly in phase with each other. The proposed method allows combining a power factor correction (PFC) stage and a power conversion stage into a single stage power converter while maintaining an excellent power factor. In some examples, this may minimize size and cost.

Digital control of the power converter may be exploited. Accordingly, the operation of the power converter may be adjusted based on a wide range of parameters, e.g., input voltage, output voltage, output current, output power, input filter impedance, phase-angle of AC input and other parameters.

With the proposed method, the operation of the power converter may be tuned according to knowledge about the behavior of the input filter. For example, if the input filter comprises a capacitor, the operation of the power converter may be tuned according to knowledge about the size of the capacitor. More generally, the operation of the power converter may be tuned according to knowledge about the input impedance of the power converter, which may be related to the size of an input capacitor as well as other components, e.g., other capacitors and inductors that make up the input filter of a power converter incorporating one or more aspects of this disclosure. The result may be an optimized power factor. This may be based on a combination of a known input filter impedance and the power converter impedance, regardless of variations on line or load side.

In some examples, a power converter may include a transistor, e.g., as a switch, which may be controlled to implement one or more aspects of this disclosure. A controller may be configured to measure a first parameter and ascertain (e.g., read from a memory or measure using a measuring device) a second parameter. The controller may also be configured to dynamically modulate a duty cycle of the switch based on the first parameter and the second parameter by modulation of on time, switching period, switching frequency or other measures which modulate the power transferred. The modulation of duty cycle and its frequency can be in addition and independent of the control loop, the control loop frequency and the switching frequency. As described herein, some examples may modulate the duty cycle of the switch, for example, using pulse-width-modulation, pulse-duration modulation, or pulse-density-modulation. Pulse-width-modulation or pulse-duration modulation are each modulation techniques wherein the width of the pulse, i.e., the pulse duration, is modulated based on a modulator signal. In a pulse-density-modulation, the relative density of a pulses corresponds to an analog signal's amplitude. Other examples may use pulse-frequency-modulation or another suitable modulation technique. In pulse-frequency-modulation, the frequency of a pulse train is varied based on the instantaneous amplitude of the modulating signal at sampling intervals.

FIG. 1 is a block diagram illustrating a system 100 for converting power from power source 102, in accordance with one or more aspects of the present disclosure. FIG. 1 shows system 100 as having four separate and distinct components shown as power source 102, power converter 104, filter 106, and load 108, however system 100 may include additional or fewer components. For instance, power source 102, power converter 104, filter 106, and load 108 may be four individual components or may represent a combination of one or more components that provide the functionality of system 100 as described herein.

System 100 may include power source 102 which provides electrical power to load 108. For example, when power source 102 comprises a generator or generators, transformers, batteries, solar panels, or regenerative braking systems, system 100 may include power source 102. In other examples, system 100 may be separate from power source 102. For example, when power source 102 comprises power grids, generators, transformers, external batteries, external solar panels, windmills, hydro-electrical or wind-powered generators, or any other form of devices that are capable of providing electrical power to system 100, system 100 may be separate from power source 102. As described above, numerous examples of power source 102 exist and may include, but are not limited to, power grids, generators, transformers, batteries, solar panels, windmills, regenerative braking systems, hydro-electrical or wind-powered generators, or any other form of devices that are capable of providing electrical power to system 100.

System 100 includes power converter 104 which operates as a switch-based power converter that converts one form of electrical power provided by power source 102 into a different, and usable form, of electrical power for powering load 108. Power converter 104 may be a step-up converter that outputs power with a higher voltage level than the voltage level of input power received by the step-up converter. One example of such step-up converter may be referred to as a boost converter. Power converter 104 may instead comprise a step-down converter configured to output power with a lower voltage level than the voltage level of input power received by the step-down converter. One example of such a step-down converter may be referred to as a buck converter. In still other examples, power converter 104 may be a step-up and step-down converter (e.g., a buck-boost converter) that is capable of outputting power with a voltage level that is higher or lower level than the voltage level of the power input received by the step-up and step-down converter. Examples of power converter 104 may include battery chargers, microprocessor power supplies, and the like. Generally, the systems and methods described herein may be applied to single stage flyback AC-to-DC converters. It will be understood, however, that power converter 104 may be a DC-to-DC converter, DC-to-AC converter or some type of AC-to-DC converter in addition to flyback converters.

System 100 further includes filter 106 and load 108. Load 108 receives the electrical power (e.g., voltage, current, etc.) converted by power converter 104 after the power passes through filter 106. In some examples, load 108 uses the filtered electrical power from power converter 104 and filter 106 to perform a function. Numerous examples of filter 106 exist and may include, any suitable electronic filter for filtering power for a load. Examples of filter 106 include, but are not limited to, passive or active electronic filters, analog or digital filters, high-pass, low-pass, band pass, notch, or all-pass filters, resistor-capacitor filters, inductor-capacitor filters, resistor-inductor-capacitor filters, and the like. Likewise, numerous examples of load 108 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 102 may provide electrical power with a first voltage or current level over link 110. Load 108 may receive electrical power that has a second voltage or current level, converted by power converter 104, and filtered through filter 106, over link 114. Links 110, 112, and 114 represent any medium capable of conducting electrical power from one location to another. Examples of links 110, 112, and 114 include, but are not limited to, physical and/or wireless electrical transmission mediums such as electrical wires, electrical traces, conductive gas tubes, twisted wire pairs, and the like. Each of links 110 and 112 provide electrical coupling between, respectively, power source 102 and power converter 104, and power converter 104 and filter 106. Link 114 provides electrical coupling between filter 106 and load 108. In addition, link 114 provides a feedback loop or circuit for carrying information to power converter 4 associated with the characteristics of a filtered power output from filter 106.

In the example of system 100, electrical power delivered by power source 102 can be converted by power converter 104 to power that has a regulated voltage and/or current level that meets the power requirements of load 108. For instance, power source 102 may output, and power converter 104 may receive, power which has a first voltage level at link 110. Power converter 104 may convert the power which has the first voltage level to power which has a second voltage level that is required by load 108. Power converter 104 may output the power that has the second voltage level at link 112. Filter 106 may receive the power from power converter 104 and output the filtered power that has the second voltage level at link 114.

Load 108 may receive the filtered power that has the second voltage level at link 114. Load 108 may use the filtered power having the second voltage level to perform a function (e.g., power a microprocessor). Power converter 104 may receive information over link 114 associated with the filtered power that has the second voltage level. For instance, feedback control (e.g., current sensing) circuitry of power converter 104 may detect the voltage or current level of the filtered power output at link 114 and driver/control logic of power converter 104 may adjust the power output at link 112 based on the detected voltage or current level to cause the filtered power output to have a different voltage or current level that fits within a voltage or current level tolerance window required by load 108. In accordance with one or more aspects of the present disclosure, digital control of a power converter may be exploited to improve power factor, THD, or output stability. The operation of the power converter may be adjusted based on a wide range of parameters, e.g. input voltage, output voltage, input current, output current, input power, output power, input filter impedance, phase-angle of AC input and other parameters to adjust AC current and AC voltage. For example some of these parameters may be used to adjust AC input current and AC input voltage to be in phase or more closely in phased with each other to improve power factor because the best power factors are when AC current and AC voltage are exactly in phase with each other.

In some examples, the proposed method may allow combining the power factor correction (PFC) stage and the power conversion stage into a single stage power converter while maintaining an excellent power factor. This may minimize size and cost of the power converter. In other examples, aspects of the current disclosure may be used in conjunction with multistage power converters to further enhance the operation of the multistage power converter by improving power factor, THD, or output stability. In some examples, the techniques of this disclosure may be used to improve other aspects of single stage power converter or multistage power converter operation.

With the proposed method, the operation of the power converter may also be tuned according to knowledge about the behavior of the input filter. The result is an optimized power factor of the combination of the known input filter impedance and the power converter impedance, regardless of variations on the line, i.e., the input side, or on the load side, i.e., the output side.

As described above, power converter 104 may be a single stage power converter in some examples. In other examples, the power converter may be a dual stage power converter. Power converter 104 may include a switch, such as a transistor 210, which may be controlled to implement one or more aspects of this disclosure. For example, controller 212 may control transistor 210 to implement one or more aspects of this disclosure so as to improve one or more of power factor, THD, or output stability.

In some examples, a controller may be configured to measure a first parameter. The first parameter may be one of input voltage, output voltage, output current, phase angle, or other parameter related to the functioning of the power converter, such as input current, operating temperature, frequency, capacitance, etc. Generally, the first parameter may be a value that is measured. In other examples, the first parameter may be ascertaining by reading a predetermined value, e.g., from memory rather than measured.

The controller may also be configured to ascertain a second parameter. In some examples, similar to the first parameter, the second parameter may be ascertained by measuring. In other examples, ascertaining the second parameter may relate to reading a predetermined value, e.g., from memory.

The controller may also be configured to dynamically modulate a duty cycle of the switch based on the first parameter and the second parameter, for example, by modulation of on-time, switching period, switching frequency or other measures which modulate the power transferred. The modulation of duty cycle and its frequency may be in addition and independent of the control loop, the control loop frequency and the switching frequency. The dynamically modulating of the duty cycle of the switch based on the first parameter and the second parameter may include applying a function of the first parameter and the second parameter to determine on time, switching period or switching frequency. As claimed, at least two parameters (the first parameter and the second parameter) are used to dynamically modulate duty cycle of the switch. It will be understood, however, that many different parameters and combinations of parameters may be used to dynamically modulate duty cycle of the switch.

Figure 2:
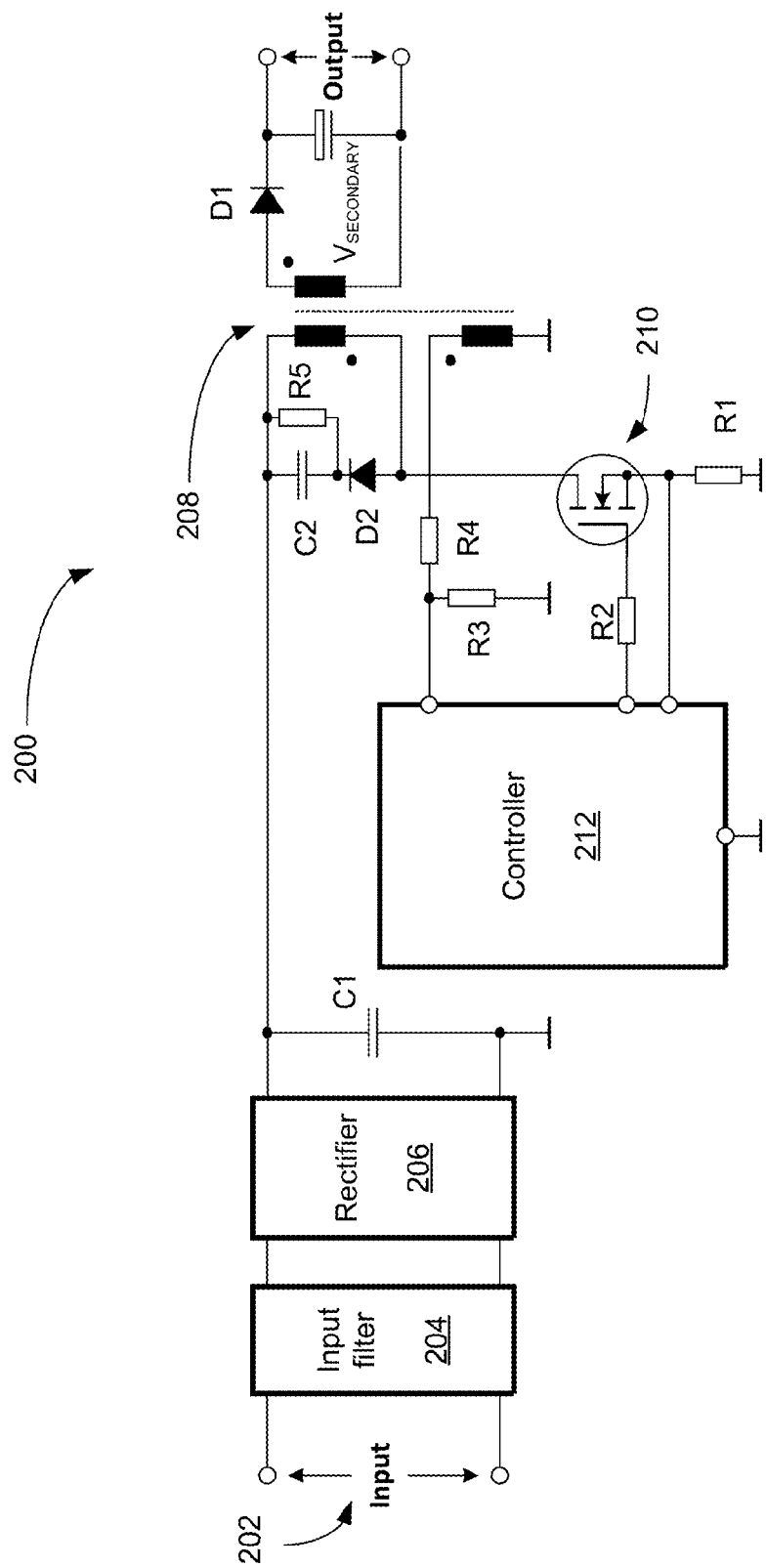
FIG. 2 is a block diagram illustrating an example power converter in accordance with one or more aspects of the present disclosure.

FIG. 2 is a block diagram illustrating an example of a flyback power converter 200 in accordance with one or more aspects of the present disclosure. Power converter 104 of FIG. 1 may be a flyback power converter, however, it will be understood that aspects of this disclosure may be applied to other types of power converters. A flyback converter may be used in both AC/DC and DC/DC conversion and may provide galvanic isolation between the input and any outputs. Galvanic isolation is a principle of isolating functional sections of electrical systems to prevent current flow; no direct conduction path is permitted. The illustrated flyback converter 200 of FIG. 2 may have an AC input 202 which may be filtered by input filter 204 and rectified by bridge rectifier 206. The output of bridge rectifier 206 may be further filtered by capacitor C1.

Flyback power converter 200 is a boost converter with an inductor split to form a transformer 208, so that the voltage ratios may be multiplied. When transistor 210 is closed, e.g., controller 212 turns transistor 210 on using a signal through R2, the primary of the transformer is connected between the input voltage source and ground through a resistor R1. The primary current and magnetic flux in the transformer increases, storing energy in the transformer. The voltage induced in the secondary winding, $V_{SECONDARY}$, will be negative, so diode D1 is reverse-biased. Accordingly, during this state an output capacitor or battery may supply energy to the output. Additionally, when transistor 210 is closed, D2 is revere biased and current does not flow though diode D2. The D2/C2/R5 circuitry forms a snubber circuit. A snubber is a device used to suppress ("snub") voltage transients in electrical systems. The resistors R3 and R4 are used to measure input voltage which may be reflected from the primary winding to the auxiliary winding during on-time of the transistor 210.

When transistor 210 is opened, e.g., using an output of controller 212 through R2, the primary current and magnetic flux drops. The secondary voltage, $V_{SECONDARY}$, is positive, forward-biasing the diode, allowing current to flow from the transformer. The energy from the transformer core recharges the output capacitor or battery and supplies the load. Additionally, when transistor 210 is open, D2 is forward biased by the voltage of the transformer. Current flows through D2 until the transformer voltage reduces to zero. As described, transistor 210 may be controlled by controller 212, which may be configured to implement a flyback converter 200 as described herein.

As described above, in accordance with one or more aspects of the present disclosure, digital control of a power converter may be exploited. This digital control may be provided, for example, by controller 212. Controller 212 may control the operation of the power converter by adjusting power converter functionality based on a wide range of parameters, e.g. input voltage, output voltage, output current, output power, input filter impedance, phase-angle of AC input and other parameters to adjust AC current and AC voltage to be in phase or more closely in phased with each other because the best power factors are when AC current and AC voltage are exactly in phase with each other. Each of these parameters, input voltage, output voltage, output current, output power, input filter impedance, phase-angle of AC input as well as others may be input into controller 212 so that controller 212 may make determinations based on them.

Using input voltage, input current, input power, output voltage, output current, output power, input filter impedance, phase-angle of AC input, and others parameters, controller 212 may provide for power factor correction and improved THD. For example, controller 212 may control the functionality of the power converter by modulating the duty cycle by a configurable function that may take into account input voltage, input current, input power, output voltage, output current, output power, input filter impedance, phase-angle of AC input and other parameters.

Flyback power converter 200 may be a single stage power converter in some examples. In other examples, the power converter may be a dual stage power converter. Flyback power converter 200 may include a switch, such as a transistor 210, which may be controlled to implement one or more aspects of this disclosure. For example, controller 212 may control transistor 210 to implement one or more aspects of this disclosure.

In some examples, controller 212 may be configured to measure a first parameter. The first parameter may be one of input voltage, output voltage, output current, phase angle, or other parameter related to the functioning of the power converter, such as input current, operating temperature, frequency, and capacitance. Controller 212 may be configured to determine 1/U_RMS/sin(φ), which may be used to optimize output ripple and increase output stability. Accordingly, power converter 200 may have circuitry to measure one or more of input voltage, input power, output voltage, input current, output current, phase angle, operating temperature, frequency, capacitance, or other parameters (not shown). The measured capacitance may be the capacitance of an input circuit of the power converter, e.g., capacitor C1. As used herein, measuring the first parameter (or the second parameter) may include reading values from a measuring device external to controller 212, reading values from a measuring device the is part of or internal to controller 212, reading a memory location written with a measured value, etc.

Controller 212 may also be configured to ascertain a second parameter. In some examples, the second parameter may be ascertained by measuring. Accordingly, the second parameter may be one of input voltage, input current, input power, output voltage, input current, output current, phase angle, operating temperature, frequency, capacitance, or other parameter related to the functioning of the power converter. Thus, ascertaining may include measuring the second parameter, which includes reading values from a measuring device external to controller 212, reading values from a measuring device the is part of or internal to controller 212, reading a memory location written with a measured value, etc.

Ascertaining may also include reading a predetermined value, e.g., from a memory. Accordingly, the second parameter may be, for example, a predetermined value of input filter impedance that controller 212 may be read from a memory, register, other data storage device, etc. The memory, register, or other data storage device may be internal to controller 212 or external to controller 212.

Controller 212 may also be configured to dynamically modulate a duty cycle by modulation of on time, switching frequency or switching period of the switch (e.g., transistor 210) based on the first parameter and the second parameter. The modulation of duty cycle and its frequency can be in addition and independent of the control loop, the control loop frequency and the switching frequency. The dynamically modulating of the duty cycle of the switch based on the first parameter and the second parameter may include applying a function of the first parameter and the second parameter to determine the duty cycle, as described above. In some examples, the dynamically modulating of the duty cycle of the switch (e.g., transistor 210) occurs on a per cycle basis for an alternating input signal waveform.

Figure 3:
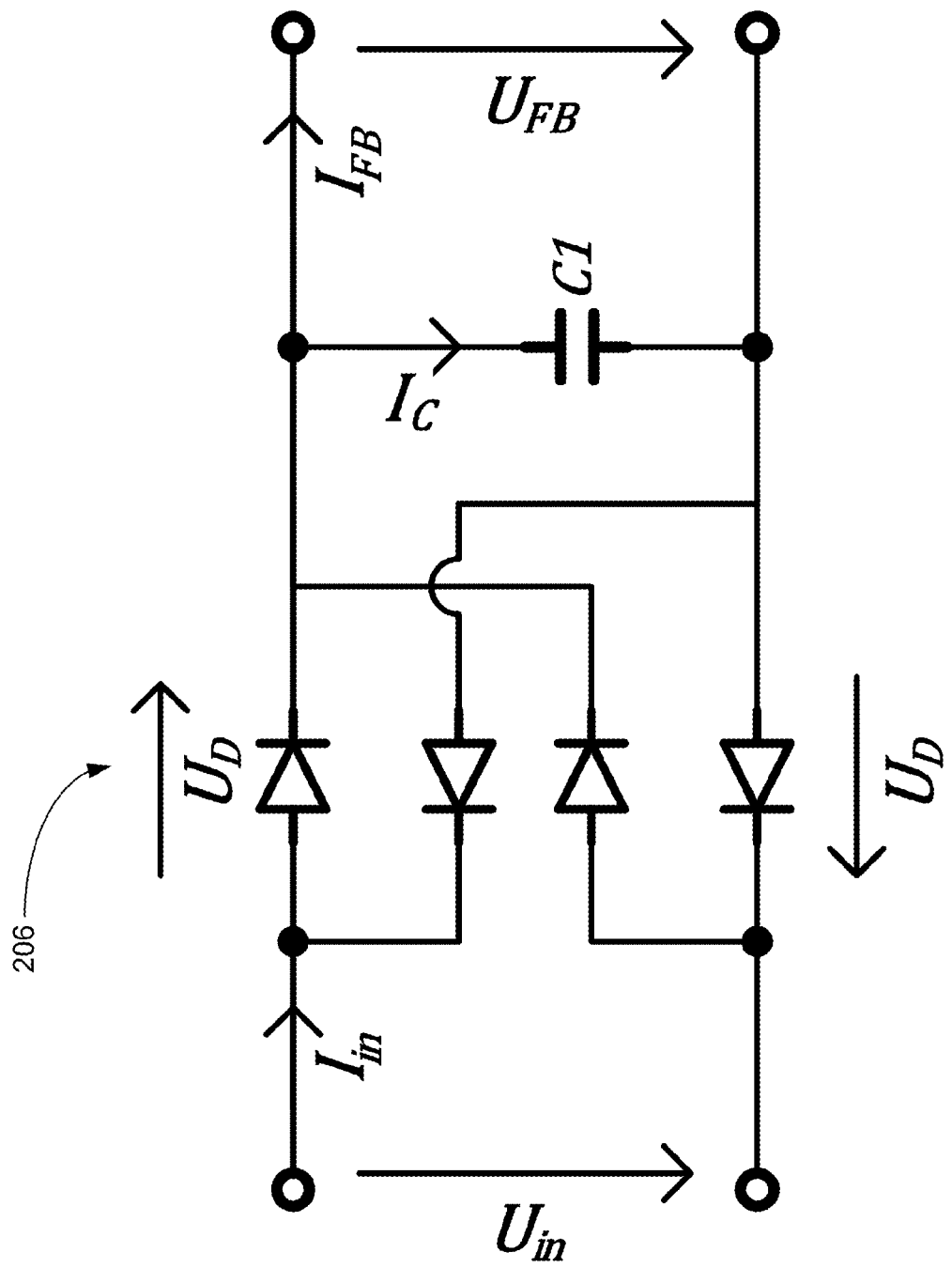
FIG. 3 is a schematic diagram illustrating one example of a simplified input filter circuit that may be used with a power converter in accordance with the systems and methods described herein.

FIG. 3 is a schematic diagram illustrating one example of a bridge rectifier 206 that may be used with a power converter in accordance with one or more aspects of the present disclosure. FIG. 3 illustrates a simplified bridge rectifier 206 and its basic setup as well as the use of an input EMI filter, C1. In the illustrated example of FIG. 3, a single capacitance, C1, is used to filter the output of bridge rectifier 206. Other filtering topologies may also be used.

In the illustrated example of FIG. 3, AC power may provide current, $I_{in}$. During an AC line half wave the capacitance may store significant energy. The stored energy may be highest when the line voltage is highest and when any load connected is lowest and may depend on the size of the capacitance. For flyback power converter 200 (not shown in FIG. 3) with constant on-time the stored energy may typically be used to provide output power when the line voltage drops below the capacitor voltage and the bridge rectifier 206 consequently blocks any input current.

Thus, the input current drops to zero when the line voltage drops below the capacitor voltage. As soon as the voltage starts to rise again, there may be a spike in the input current to charge the capacitor as soon as the input voltage rises above the remaining voltage across the capacitance. The low current or zero current when the bridge rectifier acts as a block, and the current spike afterwards, as well as the capacitive behavior in general impact the power factor and THD of the system.

For a good power factor, the input current should follow the input voltage as is the case with a resistive load with power P. (In the illustrated example, to omit the absolute value operators, all following equations are only valid for a single half wave for $$t = 0 \ldots \frac{1}{2f}\bigg):$$

$$U_{in}(t) = U_{RMS}\sqrt{2}\sin(2\pi ft)$$

$$I_{in}(t) = \frac{P}{U_{RMS}}\sqrt{2}\sin(2\pi ft)$$

To achieve this relationship between input voltage and input current the capacitance after the bridge has to be discharged and charged according to the input voltage. Otherwise the bridge would not conduct a current and the input current would drop to zero. Consequently, the voltage at capacitor C1 must be the input voltage reduced by the diode drop of the bridge $$U_{FB}(t) = U_{RMS}\sqrt{2}\sin(2\pi ft) - 2U_D$$

The current into capacitor C1 is dependent on the change of the input voltage:

$$I_C(t) = C\frac{dU_{FB}}{dt} = C2\pi f U_{RMS}\sqrt{2}\cos(2\pi ft)$$

The power converter current has to compensate the difference between $I_{in}$ and $I_C$:

$$I_{FB}(t) = I_{in}(t) - I_C(t) = \frac{P}{U_{RMS}}\sqrt{2}\sin(2\pi ft) - U_{RMS}C2\pi f\sqrt{2}\cos(2\pi ft)$$

As a consequence, the conductance of the power converter may be:

$$G_{FB}(t) = \frac{I_{FB}(t)}{U_{FB}(t)} = \frac{\frac{P}{U_{RMS}}\sqrt{2}\sin(2\pi ft) - U_{RMS}C2\pi f\sqrt{2}\cos(2\pi ft)}{U_{RMS}\sqrt{2}\sin(2\pi ft) - 2U_D}$$

To simplify the equation it may generally be assumed that: $U_D \ll U_{RMS}$ accordingly:

$$G_{FB}(t) \approx \frac{P}{U_{RMS}^2} - \frac{C2\pi f}{\tan(2\pi ft)}$$

Figure 4:
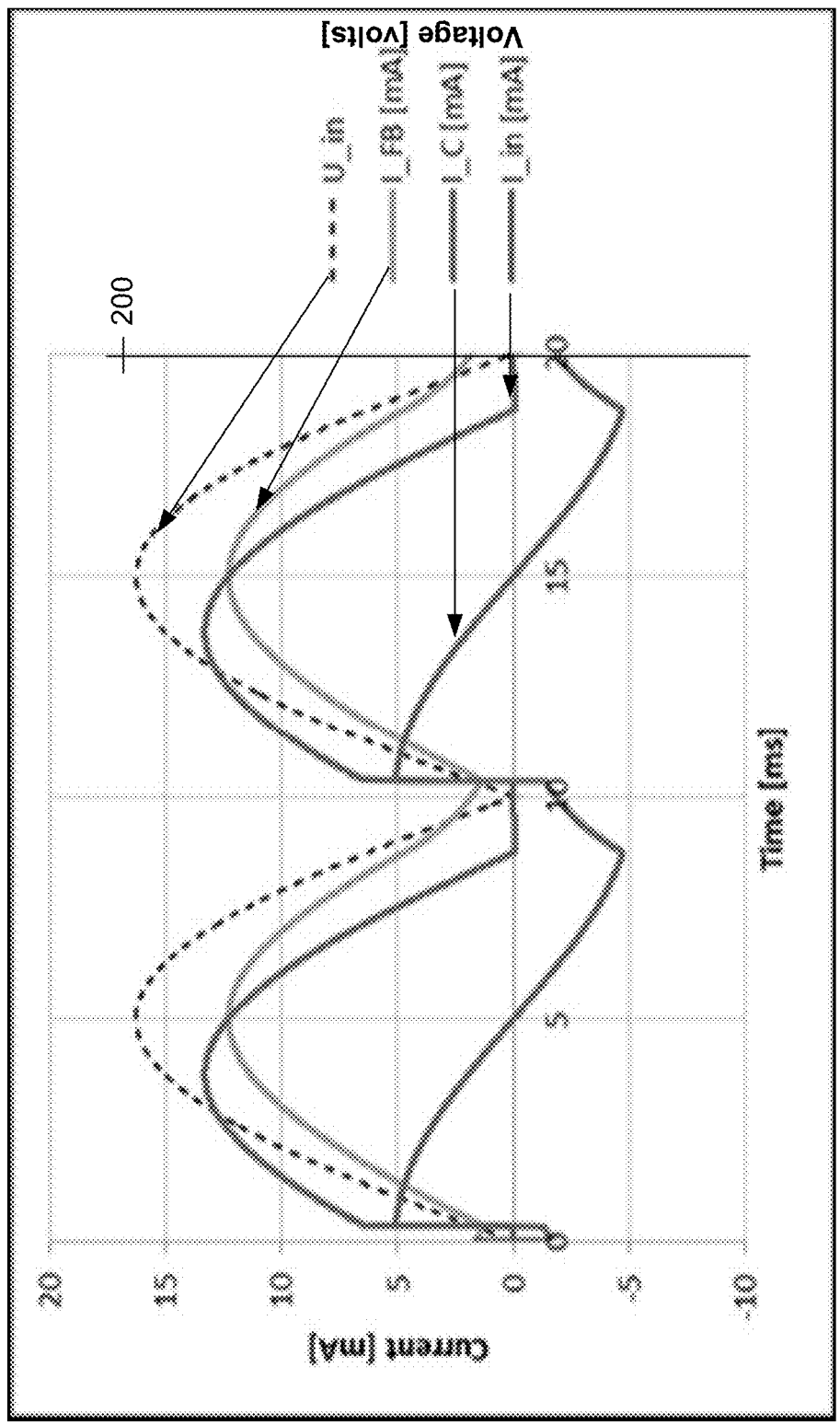
FIG. 4 is a graph that illustrates example waveforms for a constant on-time.
Figure 5:
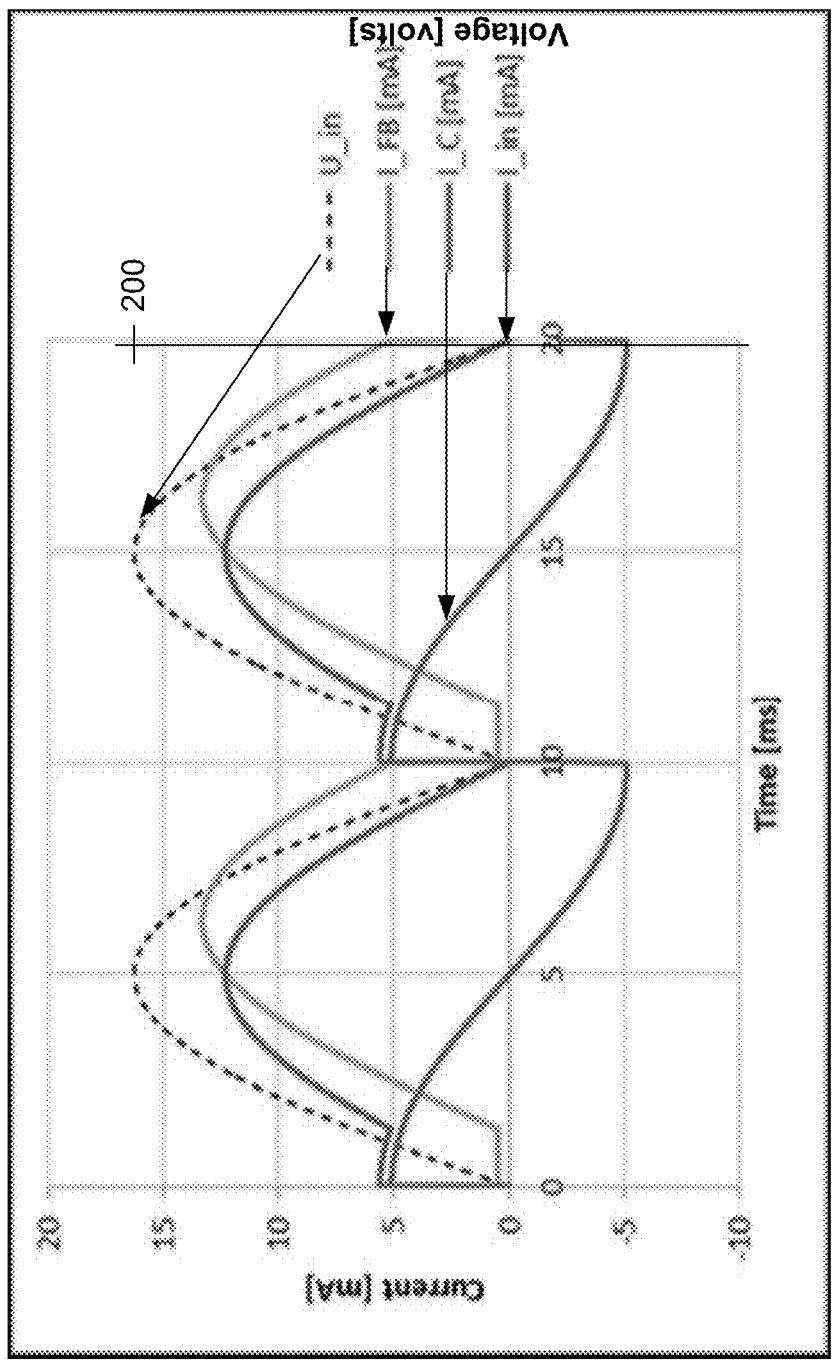
FIG. 5 is a graph that illustrates example waveforms for duty cycle modulation using modulation of on time in accordance with one or more aspects of the present disclosure.

Referring now to FIGS. 4 and 5, the effects of improvement of power factor are illustrated by comparing FIG. 4 and FIG. 5. FIG. 4 is a graph that illustrates example waveforms for a power converter that has a constant on-time. The power converter has a pure resistive behavior (I_FB). Two properties of the resulting input current may have a negative impact on a power source, such as an electrical power distribution network, as will be illustrated with respect to FIG. 4. The superposition of input filter current (I_C) and power converter current (I_FB) is the input current I_in. As illustrated in FIG. 4, I_in has a significant offset to the input voltage. This may result in a poor power factor. Additionally, the input filter capacitor, C1, behind the bridge rectifier is not discharged, so the input current (I_in) drops to zero and the flyback converter is supplied by the input filter capacitor. This results in a poor THD. Accordingly, as illustrated in FIG. 4, both power factor and THD are poor for the example of that figure.

FIG. 5 is a graph that illustrates example waveforms for the duty cycle modulation using an modulation of on-time in accordance with one or more aspects of the present disclosure. The power converter current (I_FB) compensated the input filter current (I_C) in the extent that the resulting input current I_in is synchronized with the input voltage. In other words, as the input voltage increases, the input current also generally increases and as the input voltage decreases, the input current generally decreases. This results in a very good power factor. Additionally, the THD is improved somewhat. At the beginning of the half-wave, however, the input filter needs to charge very quickly because of the steep increase of the input voltage. A flyback power converter cannot provide this current from the secondary side, so it has to be drawn from the input. This results in a "corner," i.e., a spike in the input current, as illustrated by the input current waveform of FIG. 5. One way to avoid this may be by the use of a power converter that is able to reverse the power transfer from the output to the input filter. Another solution may be additional circuitry which stores some energy during the half wave and feeds it back to the input filter at the beginning of the half wave.

In accordance with one or more aspects of the present disclosure, the on-time of the power converter may be modulated by a configurable function which takes into account the transferred power P, i.e., power out, the input voltage U_in, input impedance, as well as the phase angle in the half wave and other parameters, as described herein.

G_FB (and I_FB consequently) cannot be negative as the power converter would have to provide current to the input filter in this case. Also because of application limitations, G_FB needs to be saturated at G_(FB,min) and G_(FB, max). These boundaries may limit the improvement of the power factor as illustrated in FIG. 5.

For the instantaneous conductance (assume (t) after every symbol):

$$G_{FB} = \frac{I_{FB}}{U_{FB}} = \frac{t_{on}I_{pp}}{T_{period}2} =$$

$$\frac{t_{on}t_{on}U_{FB}}{T_{period}L2} = \frac{t_{on}t_{on}U_{FB}}{\left(t_{on} + \frac{t_{on}U_{FB}}{nU_{out}} + \frac{T_{osc}}{2}\right)L2} = t_{on}\frac{U_{FB}}{\left(2 + \frac{2U_{FB}}{nU_{out}} + \frac{T_{osc}}{t_{on}}\right)L}$$

Assuming $t_{on} \gg T_{osc}$:

$$t_{on}(t) \approx \left(\frac{2L}{U_{FB}(t)} + \frac{2L}{nU_{out}}\right)\left(\frac{P}{U_{RMS}^2} - \frac{C2\pi f}{\tan(2\pi ft)}\right).$$

In order to regulate the output current or output voltage usually the on-time of the switch may be regulated by, e.g., a PI regulator. The result of the regulator is a fixed on-time $t_{on,avg}$:

$$t_{on}(t) = t_{on,avg} \times p(t),$$

wherein:

$$p(t) = 1 - \frac{U_{RMS}^2}{P}\frac{C2\pi f}{\tan(2\pi ft)}.$$

Accordingly, using these functions, in some examples, the first parameter may include one of input voltage, $U_{RMS}$ or output voltage, $U_{OUT}$; and the second parameter may include one of capacitance of an input filter, C; or frequency, f, of an input alternating current signal.

The resulting example modulation factor p(t) for the PFC scales with input voltage $U_{RMS}$, capacitance C and reciprocal power 1/P. For low input voltages, large power and small capacitance, $t_{on}$ can basically be fixed to the average value to achieve an acceptable power factor. This is equivalent to the constant on-time solution.

In other examples, other functions might be used to optimize other variables. Generally, in some examples, more energy may be provided to the power converter output when input voltage is low and less energy may be provided to the power converter output when input voltage is high. Such a configuration may provide a more stabilized output. A more stabilized output may not require less filtering at the output. This may, for example, decrease the capacitance needed for filtering capacitors used to filter the output. In turn, this may decease cost and decrease size for on output capacitors. Which may generally lower the cost and lower the size of a power converter implementing one or more aspects of this disclosure, as well as electrical devices or electronic devices using such a power converter.

In various examples, power factor, THD, output stability may be improved using one or more aspects described herein. Some example implementations may optimize output stability of the power converter at expense of power factor. In other words, as output stability of the power converter goes up power factor may be less desirable.

In some examples, modulation of on-time for power factor may also improve THD somewhat. Different on-time equations might better improve output stability.

In some examples, an AC/DC power supply may be used in conjunction with light emitting diode (LED) lighting. Accordingly, it may be advantageous to apply one or more aspects of this disclosure to provide possibly inexpensive circuitry which, in some examples, may provide a good power factor. LED lighting may use many LEDs in parallel. Accordingly, while one or more aspects of this disclosure may, in some cases, not be needed with a single LED, it may be useful when powering an array of LEDs. Additionally, in some cases, LED lighting may be dimmed. Accordingly, a power converter providing power for LED lighting may need to adapt to varying power requirements. Generally brighter LED lighting will require more power and dimmer LED lightning will require less power. Some examples may provide both on-time control and peak output current control.

Figure 6:
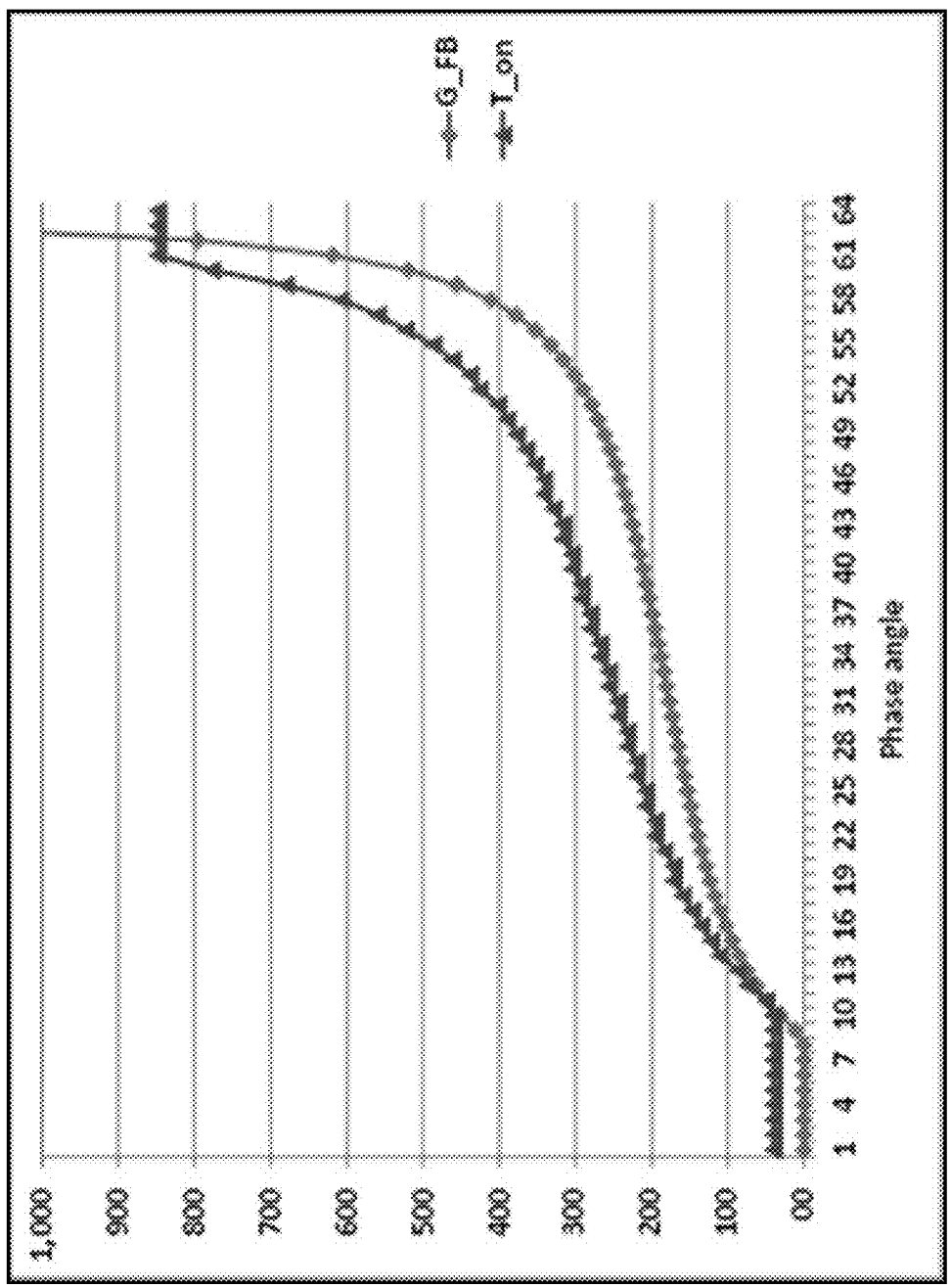
FIG. 6 is a graph illustrating examples of the conductance $G_{FB}$ and the approximated implementation including minimum saturation and maximum saturation for duty cycle modulation using modulation of on-time $t_{on}(t)$ versus phase angle.

FIG. 6 is a graph illustrating examples of the conductance $G_{FB}$ and the approximated implementation including min/max saturated for on-time $t_{on}(t)$ versus phase angle.

Figure 7:
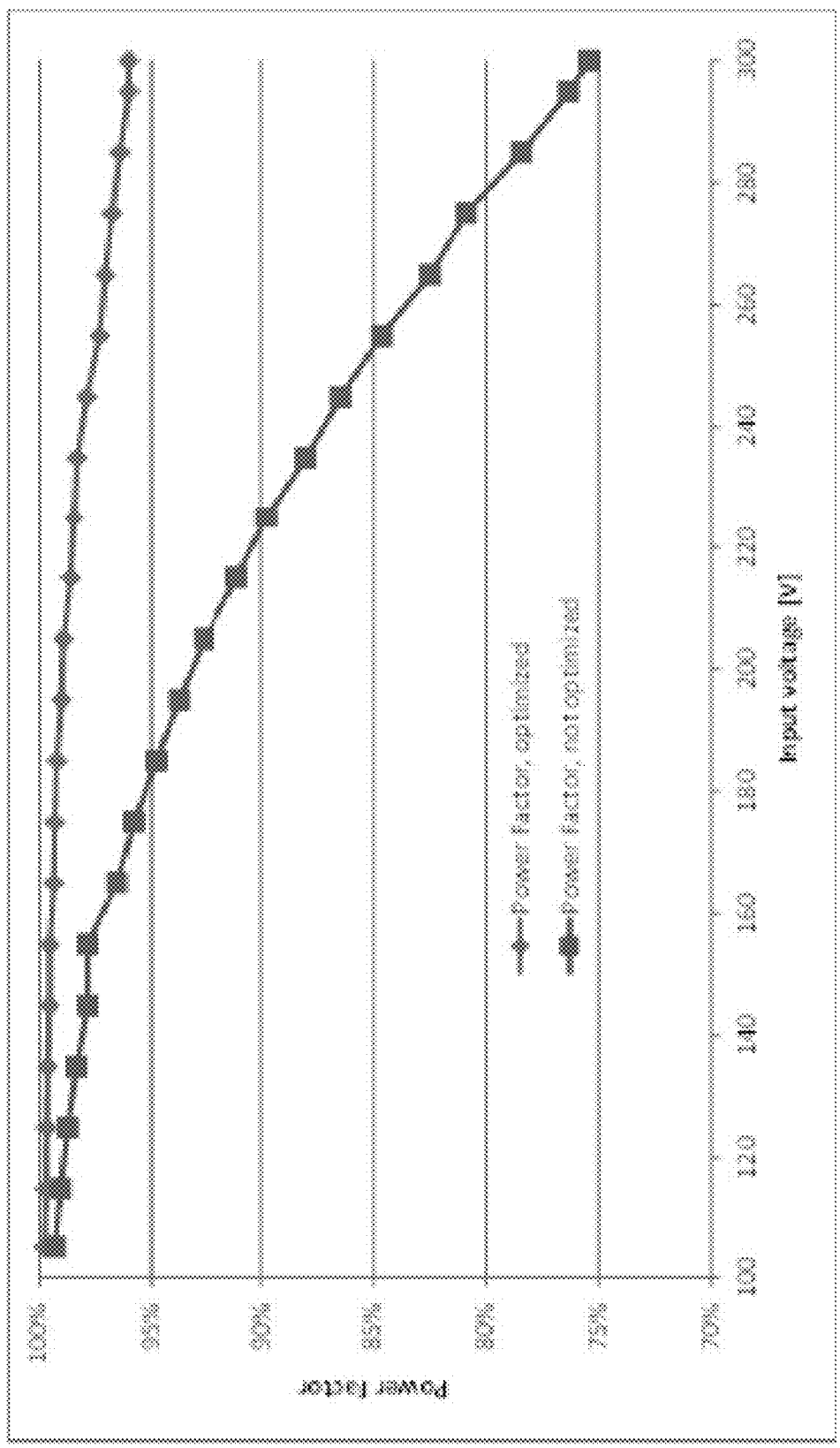
FIG. 7 is a graph illustrating measurement results of input voltage versus power factor on an example implementation in accordance with one or more aspects of the present disclosure.

FIG. 7 is a graph illustrating measurement results of input voltage versus power factor on an example implementation in accordance with one or more aspects of the present disclosure. The power factor optimized curve and power factor not optimized curve illustrate an improvement in power factor for the proposed method, i.e., the power factor optimized curve relative to the power factor not optimized curve. The illustrated example of FIG. 7 illustrates optimization in accordance with one or more aspects of the present disclosure, including use of a modulation function p(t) in combination with additional optimization of the input filter hardware. The use of a digital core allows flexible configuration of the modulation function p(t).

Figure 8:
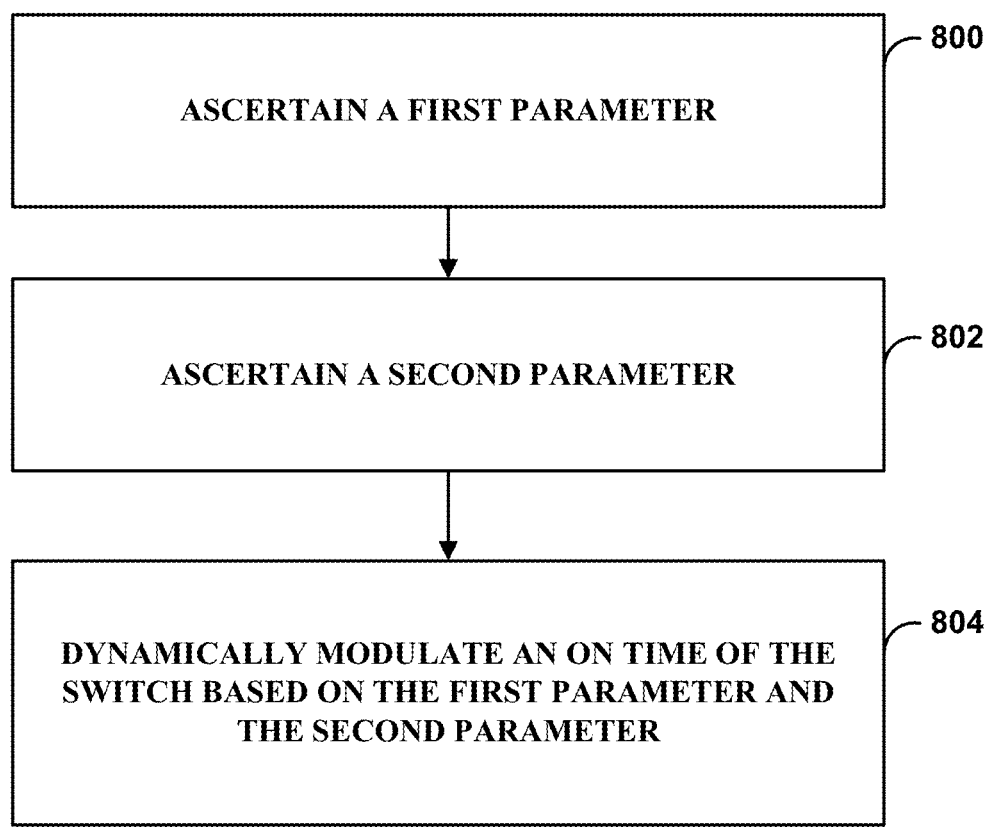
FIG. 8 is a flowchart illustrating an example method for operations of an example power converter, in accordance with one or more aspects of the present disclosure.

FIG. 8 is a flowchart illustrating example operations of an example power converter, in accordance with one or more aspects of the present disclosure. Flyback power converter 200 may be a single stage power converter in some examples. In other examples, the power converter may be a dual stage power converter. Flyback power converter 200 may include a switch, such as a transistor 210, which may be controlled to implement one or more aspects of this disclosure. For example, controller 212 may control transistor 210 to implement one or more aspects of this disclosure.

As illustrated in FIG. 8, controller 212 may be configured to ascertain a first parameter (800). In some examples, ascertaining the first parameter may include measuring the first parameter. The first parameter may be one of input voltage, output voltage, output current, phase angle, or other parameter related to the functioning of the power converter, such as input current, operating temperature, frequency, capacitance, etc. Accordingly, a power converter may have circuitry to measure one or more of input voltage, output voltage, input current, output current, phase angle, operating temperature, frequency, capacitance, or other parameters. The measured capacitance may be the capacitance of an input circuit of the power converter. As used herein, measuring the first parameter (or measuring the second parameter) includes reading values from a measuring device external to controller 212, reading values from a measuring device the is part of or internal to controller 212, reading a memory location written with a measured value, etc.

Controller 212 may also be configured to ascertain a second parameter (802). In some examples, the second parameter may be ascertained by measuring. Accordingly, the second parameter may be one of input voltage, output voltage, input current, output current, phase angle, operating temperature, frequency, capacitance, or other parameter related to the functioning of the power converter. Accordingly, ascertaining may include measuring the second parameter, which includes reading values from a measuring device external to controller 212, reading values from a measuring device the is part of or internal to controller 212, reading a memory location written with a measured value, etc.

Ascertaining may also include reading a predetermined value, e.g., from memory. Accordingly, for example, the second parameter may be a predetermined value of input filter impedance that controller 212 may read from a memory, register, other data storage device, etc. The memory, register, or other data storage device may be internal to controller 212 or external to controller 212.

Controller 212 may also be configured to dynamically modulate a duty cycle by modulation of on time, switching frequency or switching period of the switch based on the first parameter and the second parameter (804). The modulation of duty cycle and its frequency can be in addition and independent of the control loop, the control loop frequency and the switching frequency. The dynamically modulating of the duty cycle of the switch based on the first parameter and the second parameter may include applying a function of the first parameter and the second parameter to determine the duty cycle, as described above. In some examples, the dynamically modulating of the duty cycle of the switch (e.g., transistor 210) occurs on a per cycle basis for an input alternating current waveform.

Figure 9:
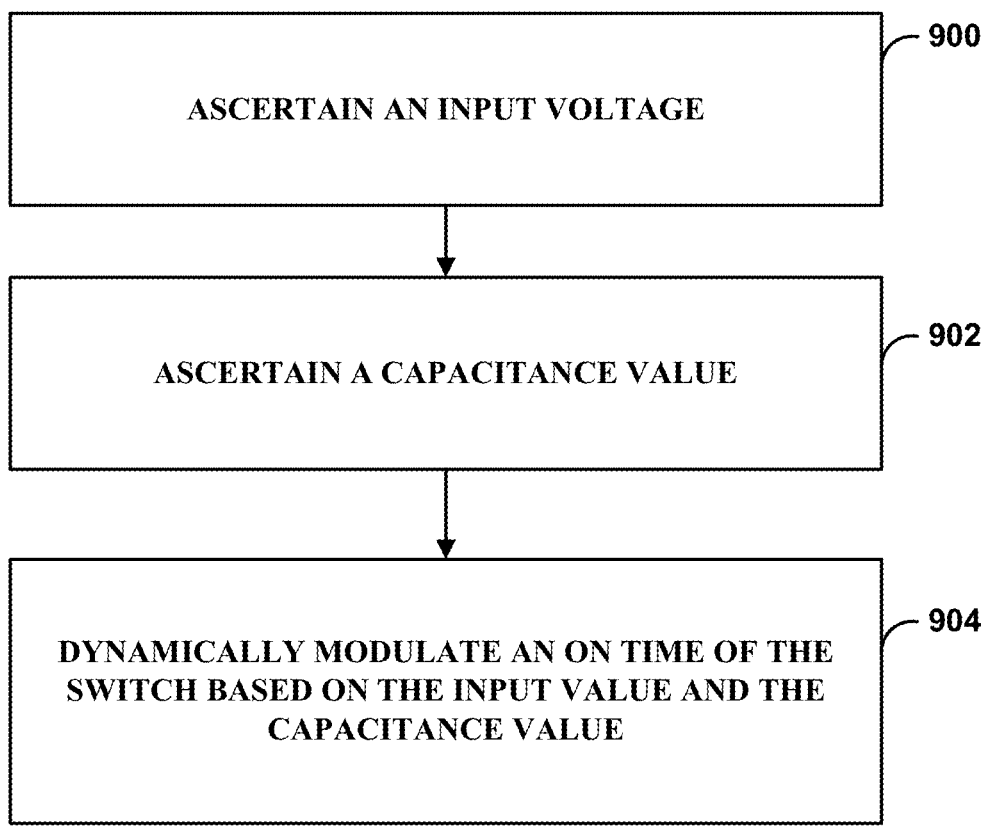
FIG. 9 is a flowchart illustrating an example method for operations of an example power converter, in accordance with one or more aspects of the present disclosure.

FIG. 9 is a flowchart illustrating example operations of an example power converter, in accordance with one or more aspects of the present disclosure. FIG. 9 illustrates a more detailed example of two specific parameters that may be measured to implement one or more aspects of the present disclosure.

As illustrated in FIG. 9, controller 212 may be configured to ascertain an input voltage (900). Accordingly, a power converter implementing one or more aspects of this disclosure may have circuitry to measure the input voltage. The input voltage may be measured directly by controller 212 if it includes circuitry for performing such a measurement. Accordingly, reading voltage measurement values may include reading a measuring device that is part of or internal to controller 212. In some examples, measuring the input voltage may include reading a voltage measurement values from a voltage measuring device that is external to controller 212. In some examples, measuring the input voltage may include reading a memory location written with a measured value.

Controller 212 may also be configured to ascertain a capacitance value (902). The capacitance value may be the capacitance value of a capacitor that makes up a filter on a voltage input to the power converter. In some examples, the capacitance value may be ascertained by reading a predetermined value, e.g., from memory. For example, a known capacitor value may be used for the input capacitance and a representation of that value may be stored in a memory location so that it may be read by controller 212. Controller 212 may read from a memory, register, other data storage device, etc. to ascertain the capacitance value, e.g., a value stored in such a location that represents a capacitance value. The memory, register, or other data storage device may be internal to controller 212 or external to controller 212.

Controller 212 may also be configured to dynamically modulate a duty cycle of the switch by modulation of on time, switching period or switching frequency based on the input voltage and the capacitance value (804). For example, the dynamically modulating of the duty cycle of the switch based on applying a function of the input voltage and the capacitance to determine the duty cycle. In some examples, the equation:

$$t_{on}(t) = t_{on,avg} \times p(t),$$

$$\text{wherein } p(t) = 1 - \frac{U_{RMS}^2}{P} \frac{C 2\pi f}{\tan(2\pi f t)},$$

discussed above may be used to modulate the on-time. In this equation, $t_{on}(t)$ is a function of the input voltage, $U_{RMS}$ and capacitance of an input filter, C. In the equation $t_{on}(t)$ is a function of power, P, input frequency, f, and the average on time as determined by an independent control loop, $t_{on,avg}$. Accordingly, controller 212 may also ascertain these values.

Figure 10:
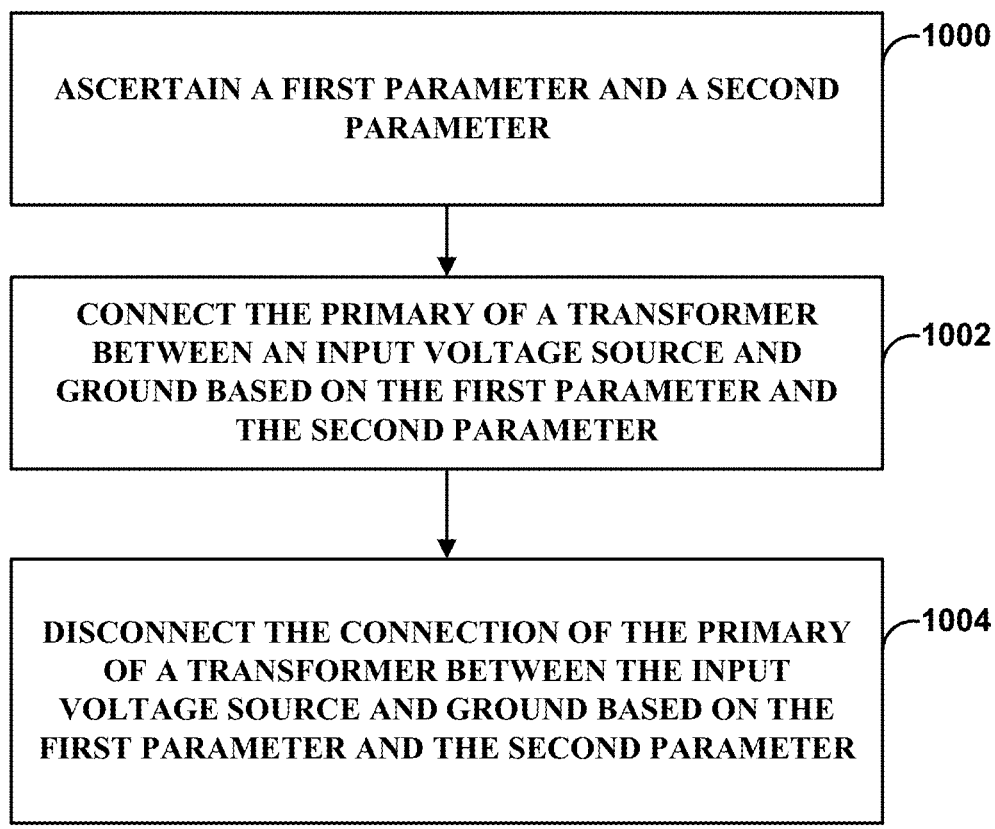
FIG. 10 is a flowchart illustrating example operations of an example power converter, in accordance with one or more aspects of the present disclosure.

FIG. 10 is a flowchart illustrating example operations of an example power converter, in accordance with one or more aspects of the present disclosure. As described above, a controller 212 may control the operation of the power converter by adjusting power converter functionality based on a wide range of parameters, e.g. input voltage, output voltage, output current, output power, input filter impedance, phase-angle of AC input and other parameters to adjust AC current and AC voltage to be in phase or more closely in phased with each other because the best power factors are when AC current and AC voltage are exactly in phase with each other.

Ascertaining a first parameter and a second parameter, each of which may include at least one of input voltage, output voltage, output current, output power, input filter impedance, phase-angle of AC input, predetermined value of input filter impedance, or other parameters (1000).

Connecting the primary of a transformer 208 between an input voltage source and ground, through a resister, based on the first parameter and second parameter (1002). For example, in some cases, a function of the first parameter and the second parameter may be used to determine when to perform the connection.

In some examples, the connection between the input voltage source and ground through the primary of a transformer 208 and the resistor may be made such that the primary current and magnetic flux in the transformer 208 increases, storing energy in the transformer 208. The voltage induced in the secondary winding, $V_{SECONDARY}$, will be negative, so diode D1 is reverse-biased. Accordingly, during this state an output capacitor or battery may supply energy to the output. Additionally, when transistor 210 is closed, D2 is revere biased and current does not flow though diode D2.

Disconnecting the connection of the primary of a transformer 208 between the input voltage source and ground (through a resistor) based on the first parameter and the second parameter (1004). For example, in some cases, a function of the first parameter and the second parameter may be used to determine when to perform the disconnection.

If a transistor 210 is used, when transistor 210 is opened, e.g., using an output of controller 212 through R2, the primary current and magnetic flux drops. The secondary voltage, $V_{SECONDARY}$, is positive, forward-biasing the diode, allowing current to flow from the transformer. The energy from the transformer core recharges the output capacitor or battery and supplies the load. Additionally, when transistor 210 is open, D2 is revere biased and current does not flow though diode D2.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A power converter comprising:
a switch; and
a controller configured to:
ascertain at least a first parameter;
ascertain at least a second parameter;
adjust a power factor of a circuit by dynamically modulating a duty cycle of the switch using one or more of pulse-width-modulation, pulse-duration modulation, or pulse-density-modulation based on at least the first parameter and the second parameter and independent of a control loop; and
convert a power of the circuit by dynamically modulating the duty cycle of the switch using one or more of pulse-width-modulation, pulse-duration-modulation, and pulse-density-modulation based on the control loop.

2. The power converter of claim 1, wherein the power converter comprise a single stage power converter and the single stage power converter is coupled to light emitting diodes (LEDs).

3. The power converter of claim 1, wherein the dynamically modulating the duty cycle of the switch occurs on a per-cycle basis for an alternating input signal waveform with a frequency which is controlled independently from the control loop.

4. The power converter of claim 1, wherein the first parameter is ascertained by measuring and the first parameter comprises one of input voltage, output voltage, output current, input power, output power and phase angle.

5. The power converter of claim 1, wherein the second parameter comprises a predetermined value of input filter impedance and the second parameter is ascertained by reading the predetermined value from a memory.

6. The power converter of claim 1, wherein the second parameter is ascertained by measuring.

7. The power converter of claim 1, wherein the dynamically modulating of the duty cycle of the switch based on the first parameter and the second parameter further comprises applying a function of the first parameter and the second parameter to determine the duty cycle.

8. The power converter of claim 7,
wherein for one or more of increasing input filter capacitance, decreasing output voltage, decreasing output current, decreasing output power, and increasing input voltage, the modulation of duty cycle is increased; and
wherein for one or more of decreasing input filter capacitance, increasing output voltage, increasing output current, increasing output power, and decreasing input voltage, the modulation of duty cycle is decreased.

9. A method comprising:
ascertaining at least a first parameter;
ascertaining at least a second parameter; and
adjusting a power factor of a circuit by dynamically modulating a duty cycle of a switch controlling a power converter using one or more of pulse-width-modulation, pulse-duration modulation, or pulse-densitymodulation, based on at least the first parameter and the second parameter and independent of a control loop; and converting a power of the circuit by dynamically modulating the duty cycle of the switch using one or more of pulse-width-modulation, pulse-duration-modulation, and pulse-density-modulation based on the control loop.

10. The method of claim 9, wherein the dynamically modulating the duty cycle of the switch occurs on a per-cycle basis for an alternating input signal waveform with a frequency which is controlled independently from the control loop.

11. The method of claim 9, wherein the first parameter is ascertained by measuring and the first parameter comprises one of input voltage, input current, input power, output voltage, output current, output power, and phase angle.

12. The method of claim 9, wherein the second parameter comprises a predetermined value of input filter impedance and the second parameter is ascertained by reading the predetermined value from a memory.

13. The method of claim 9, wherein the second parameter is ascertained by measuring.

14. The method of claim 9, wherein the dynamically modulating of the duty cycle of the switch based on the first parameter and the second parameter further comprises applying a function of the first parameter and the second parameter to determine the duty cycle.

15. A power converter comprising:
means for switching;
means for ascertaining at least a first parameter;
means for ascertaining at least a second parameter; and
means for adjusting a power factor of a circuit by dynamically modulating a duty cycle of the means for switching based on at least the first parameter and the second parameter independent of a control loop; and
means for converting a power of the circuit by dynamically modulating the duty cycle of the switch using one or more of pulse-width-modulation, pulse-duration-modulation, and pulse-density-modulation based on the control loop.

16. The power converter of claim 15, wherein the means for switching comprises a transistor.

17. The power converter of claim 15, wherein the power converter comprise a single stage power converter.

18. The power converter of claim 15, wherein the means for dynamically modulating the duty cycle of the means for switching modulates the on time, switching frequency or switching period of the switch on a per-cycle basis for at least some cycles of an alternating input signal waveform with a frequency which can be independent of the control loop.

19. The power converter of claim 15, wherein the first parameter is ascertained by measuring and the first parameter comprises one of input voltage, input current, input power, output voltage, output current, output power, and phase angle.

20. The power converter of claim 15, wherein the second parameter comprises a predetermined value of input filter impedance and wherein the second parameter is ascertained by reading the predetermined value from a data storage means.

* * * * *